United States Patent
Doemling et al.

(10) Patent No.: US 12,078,490 B2
(45) Date of Patent: Sep. 3, 2024

(54) 3D ODOMETRY IN 6D SPACE WITH ROADMODEL 2D MANIFOLD

(71) Applicant: Bayerische Motoren Werke Aktiengesellschaft, Munich (DE)

(72) Inventors: Maximilian Doemling, Landshut (DE); Qianshan Li, Shanghai (CN); Wenxin Tian, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 358 days.

(21) Appl. No.: 17/596,526

(22) PCT Filed: Jun. 14, 2019

(86) PCT No.: PCT/CN2019/091212
§ 371 (c)(1),
(2) Date: Dec. 13, 2021

(87) PCT Pub. No.: WO2020/248209
PCT Pub. Date: Dec. 17, 2020

(65) Prior Publication Data
US 2022/0252406 A1  Aug. 11, 2022

(51) Int. Cl.
*G01C 21/28* (2006.01)
*B60W 60/00* (2020.01)

(52) U.S. Cl.
CPC ........... *G01C 21/28* (2013.01); *B60W 60/001* (2020.02)

(58) Field of Classification Search
CPC ..... G01C 21/28; G01C 21/30; B60W 60/001; G05D 1/10
See application file for complete search history.

(56) References Cited

U.S. PATENT DOCUMENTS

2009/0309793 A1  12/2009  Loomis
2011/0285590 A1  11/2011  Wellington
(Continued)

FOREIGN PATENT DOCUMENTS

CN   102057247 A   5/2011
CN   105100600 A   11/2015
(Continued)

OTHER PUBLICATIONS

U.S. Non-Final Office Action issued in U.S. Appl. No. 17/596,528 dated Jul. 5, 2023 (33 pages).
(Continued)

*Primary Examiner* — Donald J Wallace
(74) *Attorney, Agent, or Firm* — Crowell & Moring LLP

(57) ABSTRACT

A method for determining a 6-dimensional (6D) delta pose of a vehicle includes obtaining a pre-defined roadmodel 2-dimensional (2D) manifold in 6D space, wherein the roadmodel 2D manifold in 6D space is pre-defined by transforming objects in a roadmodel from 3D (x, y, z) space into 6D (x, y, z, r, p, y) space, wherein x and y represent positions of objects on a horizontal plane, and z, r, p and y represent the height, roll angle, pitch angle and yaw angle of the objects in real world; obtaining a delta 3D odometry ($\Delta x$, $\Delta y$, $\theta$) from an odometer of the vehicle, wherein $\Delta x$ and $\Delta y$ represent the movements in the lateral and forward-reverse directions, and $\theta$ represents a current heading of the vehicle; projecting the obtained delta 3D odometry onto the roadmodel 2D manifold; and determining the 6D delta pose of the vehicle corresponding to the delta 3D odometry.

11 Claims, 6 Drawing Sheets

(56) References Cited

U.S. PATENT DOCUMENTS

| | | |
|---|---|---|
| 2013/0328863 A1 | 12/2013 | Pirwani |
| 2014/0267282 A1* | 9/2014 | Ren .................. G01C 21/367 |
| | | 345/428 |
| 2015/0254853 A1 | 9/2015 | Tanaka et al. |
| 2015/0341628 A1 | 11/2015 | Zeng et al. |
| 2016/0185355 A1 | 6/2016 | Yamaguchi |
| 2016/0200317 A1 | 7/2016 | Danzl et al. |
| 2018/0172457 A1 | 6/2018 | Maischberger et al. |
| 2019/0130182 A1 | 5/2019 | Zang et al. |
| 2019/0219699 A1 | 7/2019 | Ahn et al. |
| 2019/0283760 A1 | 9/2019 | Jensen et al. |
| 2020/0363815 A1* | 11/2020 | Mousavian ............ G06T 7/75 |
| 2020/0364883 A1* | 11/2020 | Hoffmann .............. G06T 7/74 |
| 2020/0371241 A1* | 11/2020 | Biber .................. G01S 7/4817 |
| 2022/0242444 A1 | 8/2022 | Doemling et al. |

FOREIGN PATENT DOCUMENTS

| | | |
|---|---|---|
| CN | 109100731 A | 12/2018 |
| EP | 3 109 591 A1 | 12/2016 |
| EP | 3 382 420 A1 | 10/2018 |
| JP | 2015-96411 A | 5/2015 |
| JP | 2018-159752 A | 10/2018 |

OTHER PUBLICATIONS

Wang J. et al., "Visual SLAM Incorporating Wheel Odometer for Indoor Robots", Proceedings of the 36$^{th}$ Chinese Control Conference (CCC), Jul. 28, 2017, pp. 5167-5172 (six (6) pages).

Chuanqiang L., "Optimization Control Methods Based on Approximate Dynamic Programming and Its Applications in Autonomous Land Vehicles", China Doctoral Dissertations Full-text Database, Nov. 15, 2017, Chapter 3, No. 11, pp. 1-140, with English language abstract (154 pages).

U.S. Final Office Action issued in U.S. Appl. No. 17/596,528 dated Nov. 21, 2023 (29 pages).

International Search Report (PCT/ISA/210) issued in PCT Application No. PCT/CN2019/091212 dated Mar. 20, 2020 (five (5) pages).

Written Opinion (PCT/ISA/237) issued in PCT Application No. PCT/CN2019/091212 dated Mar. 20, 2020 (four (4) pages).

International Search Report (PCT/ISA/210) issued in PCT Application No. PCT/CN2019/091214 dated Mar. 12, 2020 (four (4) pages).

Written Opinion (PCT/ISA/237) issued in PCT Application No. PCT/CN2019/091214 dated Mar. 12, 2020 (three (3) pages).

U.S. Non-Final Office Action issued in U.S. Appl. No. 17/596,528 dated May 16, 2024 (30 pages).

* cited by examiner

# 3D ODOMETRY IN 6D SPACE WITH ROADMODEL 2D MANIFOLD

CROSS REFERENCE TO RELATED APPLICATION

This application contains subject matter related to U.S. application Ser. No. 17/596,528, entitled "Roadmodel Manifold for 2D Trajectory Planner" filed on Dec. 13, 2021.

BACKGROUND AND SUMMARY OF THE INVENTION

The present disclosure relates in general to automated driving vehicles, and in particular, to 3D odometry in 6D space with roadmodel 2D manifold.

An automated driving vehicle (also known as a driverless car, self-driving car, robotic car) is a kind of vehicle that is capable of sensing its environment and navigating without human input. Automated driving vehicles (hereinafter, called as ADV) use a variety of techniques to detect their surroundings, such as radar, laser light, GPS, odometry and computer vision. Odometry is used to determine the movement (direction and distance) of an automated driving (AD) vehicle. Conventionally, the odometry is given in 3D (x, y, heading) and does not include elevation change of a vehicle. Even more, roads in HD maps used for AD vehicles are normally 2D (no elevation information, either). This could cause problems. Considering a slope or a curved on-ramp, the length of it is longer than the distance it appears on a 2D map. For example, a 30 degree slope that appears 160 meters long in a 2D map has an actual length of 200 meters. In such case, if the AD vehicle is instructed to drive forward for 160 meters to get to the top of the slope, it may stop in the midway of the slope since the 3D odometry indicates it has already moved 160 meters. Currently, this problem is relieved by continuously updating the location of a vehicle by traditional positioning techniques equipped on the vehicle, such as a GPS system. However, the accuracy of traditional positioning techniques and their frequencies of updating are not sufficient for an automated driving vehicle.

Therefore, a new and reliable odometry that can reflect elevation changes is desired.

The present disclosure aims to provide a method and an apparatus for creating snapshot images of traffic scenarios.

In accordance with a first exemplary embodiment of the present disclosure, a computer-implemented method for getting a 6-dimensional (6D) delta pose of a vehicle is provided. The method comprises: obtaining a pre-defined roadmodel 2-dimensional (2D) manifold in 6D space, wherein the roadmodel 2D manifold in 6D space is pre-defined by transforming objects in a roadmodel from 3D (x, y, z) space into 6D (x, y, z, r, p, y) space, wherein x and y represent positions of objects on a horizontal plane, and z, r, p and y represent the height, roll angle, pitch angle and yaw angle of the objects in real world; obtaining a delta 3D odometry (Δx, Δy, θ) from an odometer of the vehicle, wherein Δx and Δy represent the movements in the lateral and forward-reverse directions, and θ represents a current heading of the vehicle; projecting the obtained delta 3D odometry (Δx, Δy, θ) onto the roadmodel 2D manifold; and determining the 6D delta pose of the vehicle (Δx', Δy', Δz, θr, θp, θy) corresponding to the delta 3D odometry.

In accordance with a second exemplary embodiment of the present disclosure, a pose determination apparatus for getting a 6-dimensional (6D) delta pose of a vehicle is provided. The apparatus comprises a roadmodel manifold obtaining module for obtaining a pre-defined roadmodel 2-dimensional (2D) manifold in 6D space, wherein the roadmodel 2D manifold in 6D space is pre-defined by transforming objects in a roadmodel from 3D (x, y, z) space into 6D (x, y, z, r, p, y) space, wherein x and y represent positions of objects on a horizontal plane, and z, r, p and y represent the height, roll angle, pitch angle and yaw angle of the objects in real world; an odometry obtaining module for obtaining a delta 3D odometry (Δx, Δy, θ) from an odometer of the vehicle, wherein Δx and Δy represent the movements in the lateral and forward-reverse directions, and θ represents a current heading of the vehicle; a projection module for projecting the obtained delta 3D odometry (Δx, Δy, θ) onto the roadmodel 2D manifold; and a pose determining module for determining the 6D delta pose of the vehicle (Δx', Δy', Δz, θr, θp, θy) corresponding to the delta 3D odometry.

In accordance with a third exemplary embodiment of the present disclosure, a vehicle is provided which comprises a positioning system for determining positions of the vehicle; an odometer for providing delta 3D odometries (Δx, Δy, θ) of the vehicle, wherein Δx and Δy represent the movements in the lateral and forward-reverse directions, and θ represents a current heading of the vehicle; and a pose determination apparatus for getting a 6-dimensional (6D) delta pose of a vehicle according to the present invention.

The above and other aspects and advantages of the present disclosure will become apparent from the following detailed description of exemplary embodiments taken in conjunction with the accompanying drawings which illustrate, by way of example, the principles of the present disclosure. Note that the drawings are not necessarily drawn to scale.

DETAILED DESCRIPTION OF THE DRAWINGS

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

The term "vehicle" used through the specification refers to a car, an airplane, a helicopter, a ship, or the like. For simplicity, an embodiment of the invention is described with respect to "car", but the embodiments described herein is not limited to "car" only, but applicable to other kinds of vehicles. The term "A or B" used through the specification refers to "A and B" and "A or B" rather than meaning that A and B are exclusive, unless otherwise specified.

Conventionally, objects in a roadmodel are defined in a 3D space, so each point of an object can be represented by (x, y, z) in a 3D coordinate system, wherein x and y represent the location of the point on the horizontal plane, and z represents the elevation of the point. On this basis, an embodiment of the present invention proposes to represent objects in a 6D space, in which each point of an object will be represented by (x, y, z, r, p, y), wherein x, y and z represent the same as in the 3D space, while r, p and y represent the roll angle, pitch angle and yaw angle of the point, respectively.

Figure 1:
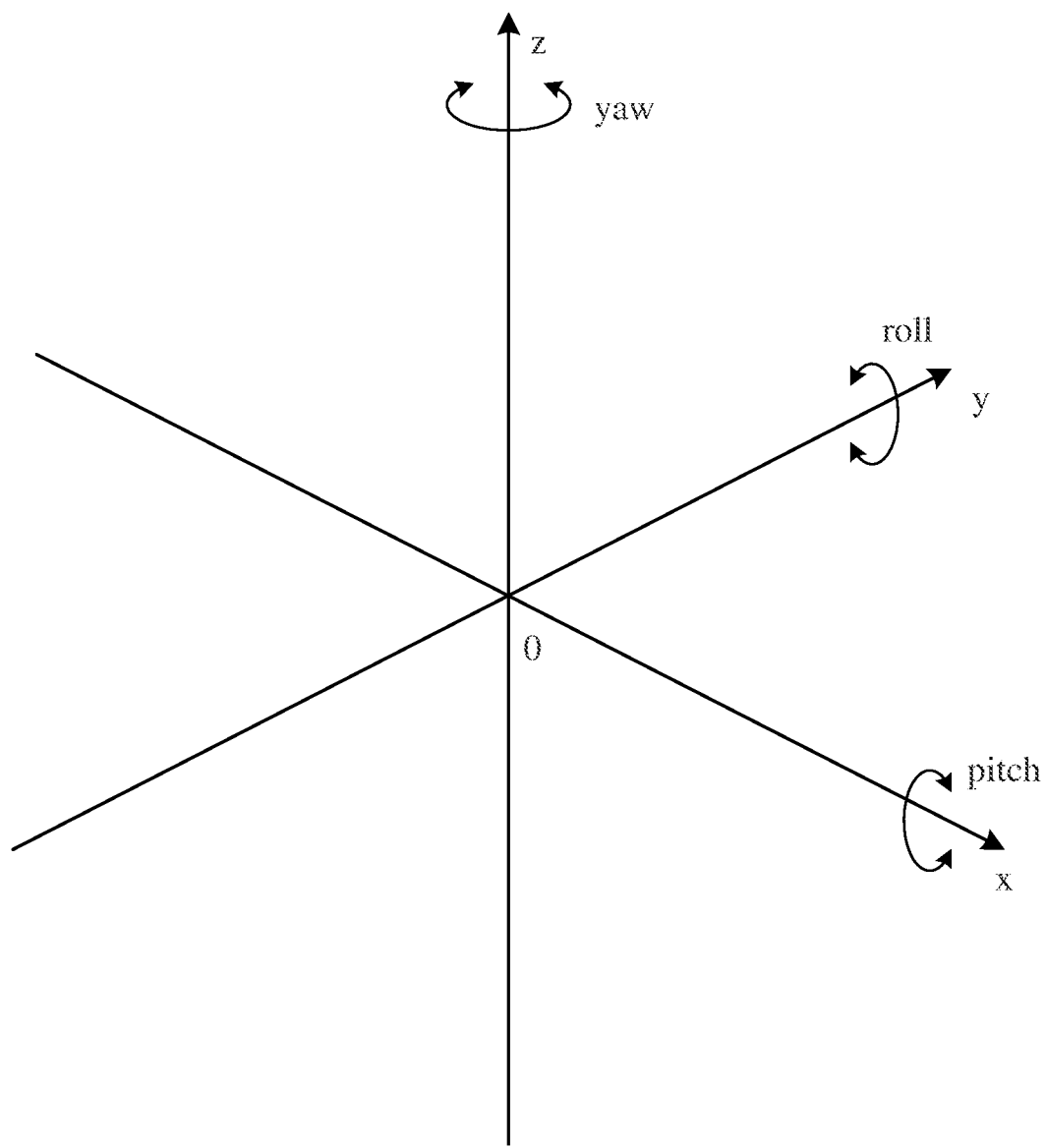
FIG. 1 shows an exemplary 6D space according to an embodiment of the present invention.

FIG. 1 shows an exemplary 6D space according to an embodiment of the present invention. As shown in FIG. 1, there are still x-axis, y-axis and z-axis used, and on this classic 3D coordinate system, the roll angle indicates the angle rotating around the y-axis, the pitch angle indicates the angle rotating around the x-axis, and the yaw angle indicates the angle rotating around the z-axis. The roll angle, pitch angle and yaw angle are also generally referred as attitude angles.

Figure 2A:
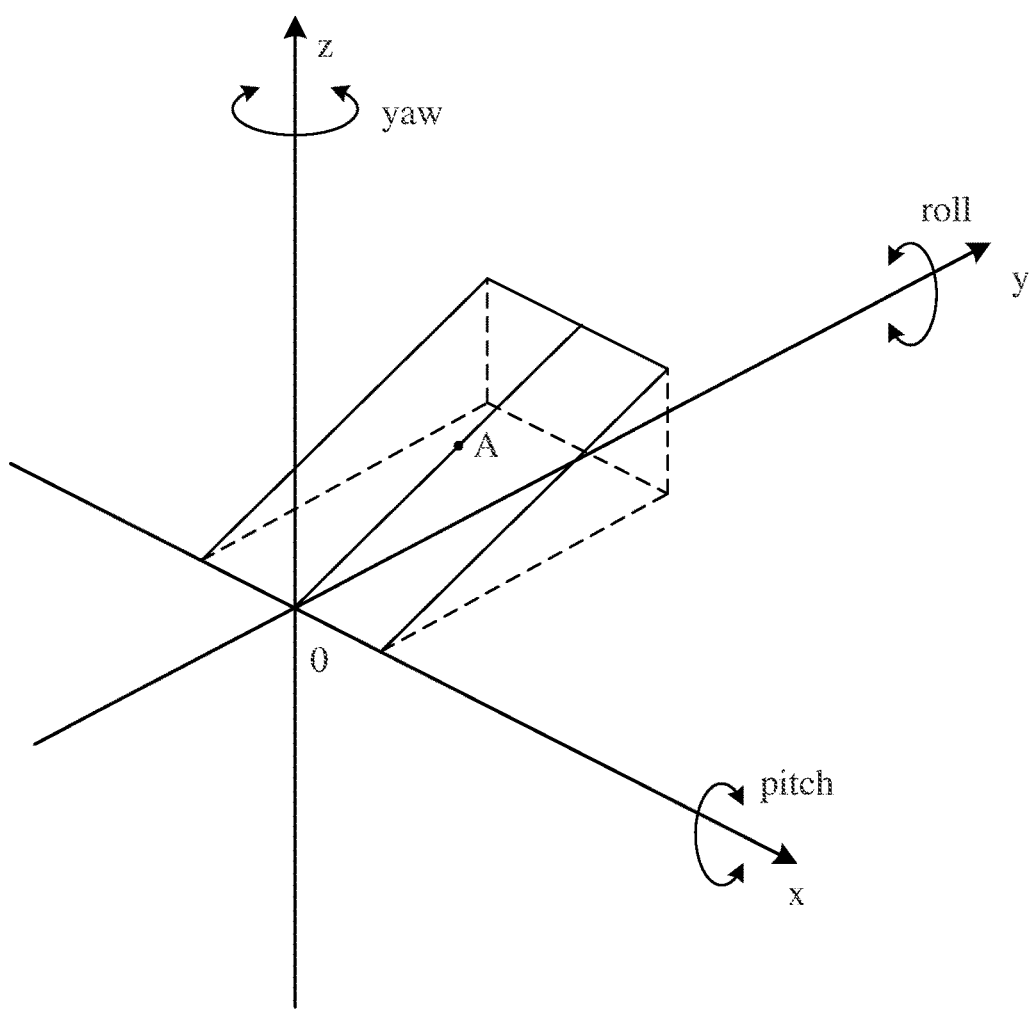
FIG. 2A shows a section of a straight sloping road in a 3D space.
Figure 2B:
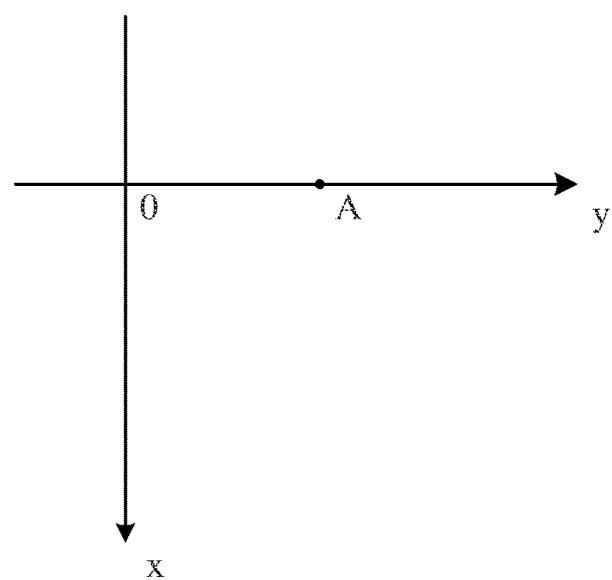
FIG. 2B shows a projection of the section of road of FIG. 2A on a horizontal plane.

With these definitions, conventional roadmodels can now be re-defined in 6D space, at least for roads in roadmodels. Roads are usually treated as horizontal in conventional maps for navigation and are therefore represented in 2D (x, y) only. However, quite a lot of roads slope, which is common in mountain areas or for on-ramps or off-ramps. For example, as shown in FIG. 2A, assume there is a section of a straight sloping road with a 30 degree of pitch angle, which may be a part of an on-ramp of an elevation road, and the forward direction of the road is alone the positive direction of the y-axis. FIG. 2B shows a projection of this section of road on the horizontal plane (i.e., the x-y plane), which looks similar to those conventional maps for navigation. Now take point A as an example, which is on the center line of the road. Assume that the point A is presented as in a conventional roadmodel, with no information of the elevation or attitude angles reflected. Now, in the 6D space according to an embodiment of the present invention, the point A may now be re-defined from (0, 160) to (0, 160, 120, 0, 30, 0), wherein the unit of x, y and z is meter and the unit of r, p and y is degree, which now clearly reflect the actual posture of the road where the point A is.

In this manner, each point of objects, at least roads, in a roadmodel can be re-defined in 6D space. With all of the objects in a roadmodel transforming from 3D (x, y, z) space into 6D (x, y, z, r, p, y) space, the transformed roadmodel can be used to further get a 6D delta pose of a vehicle based on 3D odometry ($\Delta x$, $\Delta y$, $\theta$), which may be further explained in detail in the following part. In short, if a vehicle moves on a slope, its 3D odometry readout ($\Delta x$, $\Delta y$, $\theta$) actually reflects the relative movement of the vehicle on the slope. To make it compliant with existing driving systems designed for 2D planes, such as the navigation system or the trajectory planning system, the transforming of the 3D odometry into 6D space may look, to some extent, similar to manifolding the entire roadmodel onto a 2D plane. Therefore, the new roadmodel transformed from 3D (x, y, z) space into 6D (x, y, z, r, p, y) space is hereinafter referred as "Roadmodel 2D Manifold in 6D Space" or "Roadmodel 2D Manifold".

Figure 3:
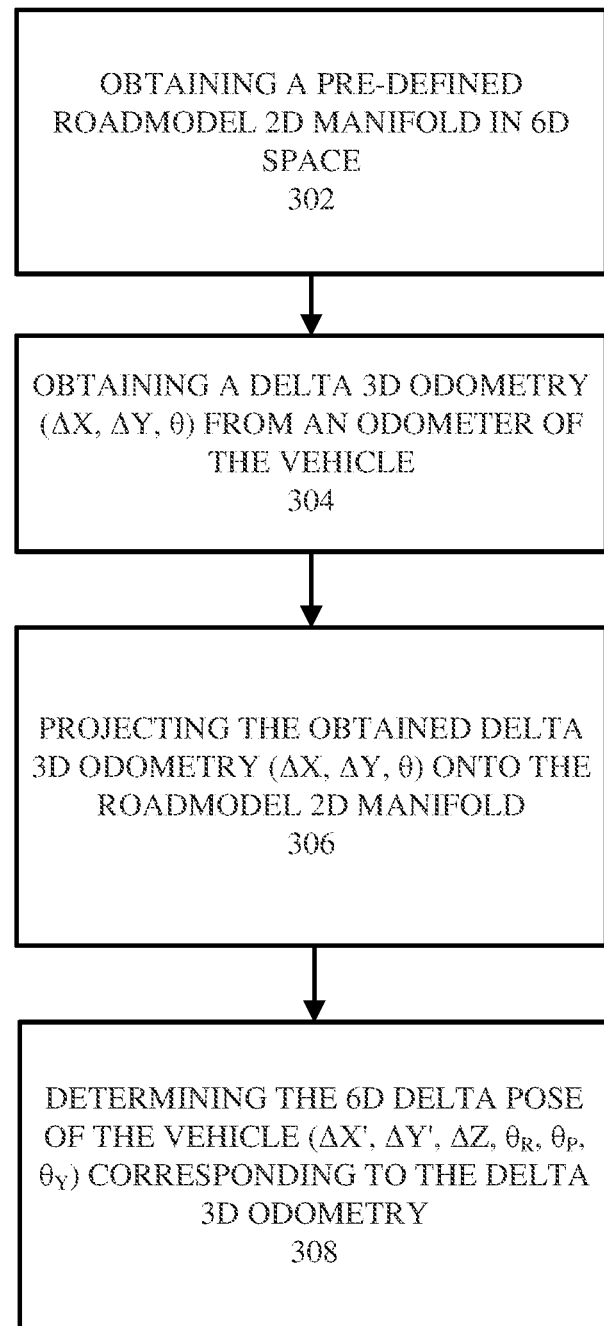
FIG. 3 is a flowchart of an exemplary method for getting a 6-dimensional (6D) delta pose of a vehicle according to an embodiment of the present invention.

FIG. 3 is a flowchart of an exemplary method for getting a 6-dimensional (6D) delta pose of a vehicle. The method starts at block 302, where a pre-defined roadmodel 2-dimensional (2D) manifold in 6D space may be obtained. The roadmodel 2D manifold, as aforementioned, may be pre-defined by transforming objects in a roadmodel from 3D (x, y, z) space into 6D (x, y, z, r, p, y) space, wherein x and y represent positions of objects on a horizontal plane, and z, r, p and y represent the height, roll angle, pitch angle and yaw angle of the objects in real world.

Figure 4A:
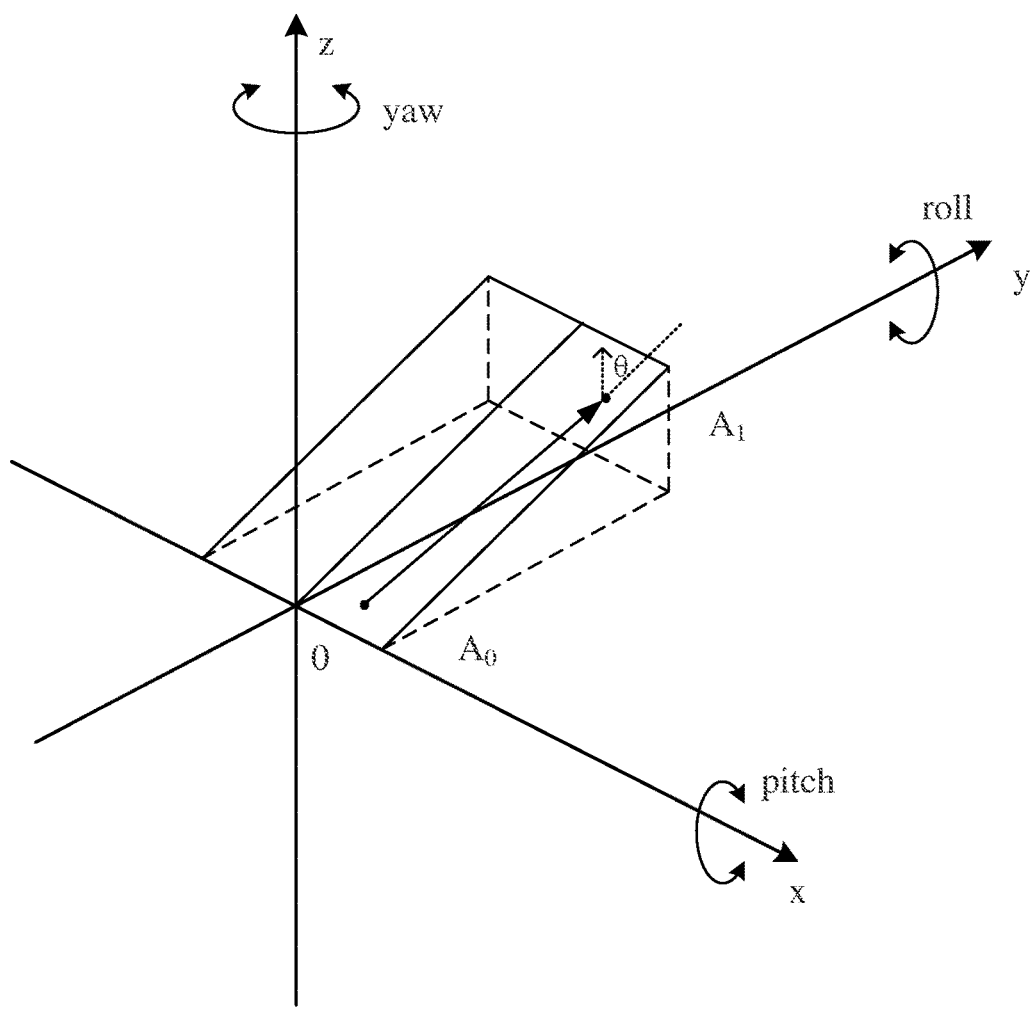
FIG. 4A shows an exemplary illustration of a movement of a vehicle corresponding to a 3D odometry in 3D space according to an embodiment of the present invention.

At block 304, a delta 3D odometry ($\Delta x$, $\Delta y$, $\theta$) may be obtained from an odometer of the vehicle, wherein $\Delta x$ and $\Delta y$ represent the movements in the lateral and forward-reverse directions, and $\theta$ represents a current heading of the vehicle. FIG. 4A shows an exemplary illustration of the movement of the vehicle corresponding to the delta 3D odometry in 3D space. In this example, assume the vehicle moves from a start point A0 to an end point A1, during which the 3D odometry readout is ($\Delta x$, $\Delta y$, $\theta$). For ease of explanation, the movement is assumed to occur on the slope as illustrated in FIG. 2A.

Figure 4B:
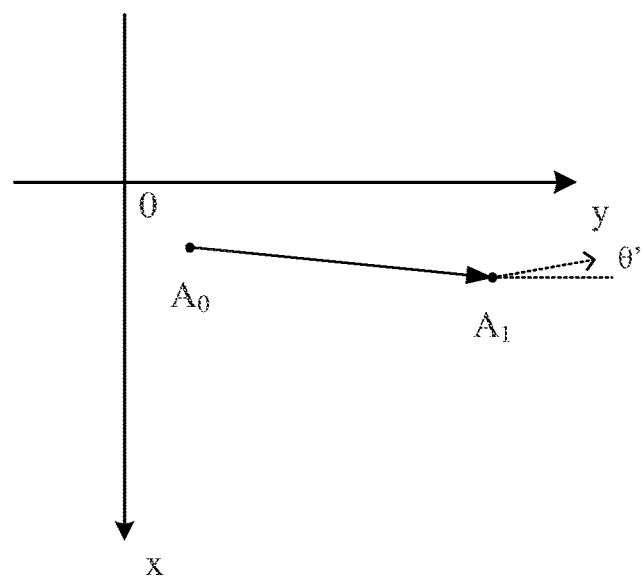
FIG. 4B shows an exemplary illustration of a projection of the 3D odometry on a horizontal plane according to an embodiment of the present invention.

At block 306, the obtained delta 3D odometry ($\Delta x$, $\Delta y$, $\theta$) may be projected onto the roadmodel 2D manifold. FIG. 4B shows an exemplary illustration of the projection of 3D odometry ($\Delta x$, $\Delta y$, $\theta$) on the horizontal plane. As aforementioned, the readout delta 3D odometry ($\Delta x$, $\Delta y$, $\theta$) merely tells the movement on the plane during the short time window at that moment, no matter whether the plane is horizontal or not. Therefore, the projection can help to figure out what are the actual horizontal and vertical movements of the vehicle as well as its true pose. As an example, projecting the obtained delta 3D odometry ($\Delta x$, $\Delta y$, $\theta$) onto the roadmodel 2D manifold may be carried out by the following steps:

1. Obtaining the position of the start point (x0, y0, z0) of the delta 3D odometry. This position information can be obtained from a positioning system like a GPS module equipped on the vehicle.
2. Determining the start point (x0, y0, z0) in the roadmodel 2D manifold (x0, y0, z0, r0, p0, y0). Since every point in a roadmodel 2D manifold is defined in 6D space, the 6D coordinates of the start point (in particular, the values of r0, p0, and y0) can be directly derived from the roadmodel 2D manifold based on (x0, y0, z0).
3. Calculating the projections ($\Delta x'$, $\Delta y'$ and $\theta'$) of the 3D odometry ($\Delta x$, $\Delta y$, $\theta$) on the horizontal plane based on r0, p0 and y0. More specifically, r0, p0 and y0, which are the roll angle, pitch angle and yaw angle respectively, can be used to project the vector of ($\Delta x$, $\Delta y$, $\theta$) onto the horizontal plane to get a horizontal vector of ($\Delta x'$, $\Delta y'$ and $\theta'$).

Thereafter, at block 308, the 6D delta pose of the vehicle ($\Delta x'$, $\Delta y'$, $\Delta z$, $\theta r$, $\theta p$, $\theta y$) corresponding to the delta 3D odometry may be determined. As an example, determining the 6D delta pose of the vehicle ($\Delta x'$, $\Delta y'$, $\Delta z$, r, p, y) corresponding to the delta 3D odometry may further comprise the following steps:

1. Determining the projection of the end point (x1, y1) of the delta 3D odometry on the horizontal plane based on the position of the start point and the calculated projections ($\Delta x'$, $\Delta y'$) of the 3D odometry. In this example, the projection of the end point A1 on the x-y plane (x1, y1) can be calculated by adding the calculated projections (Δx', Δy') of the 3D odometry to the position of the start point A0 (x0, y0).
2. Getting the position of the end point A1 in the (x1, y1, z1, r1, p1, y1) in 6D space. Again, with x1 and y1, the 6D coordinate (x1, y1, z1, r1, p1, y1) can be retrieved from the pre-defined roadmodel 2D manifold.
3. Calculating the projection (θr, θp, θy) of the heading θ of the 3D odometry in 6D space based on the roll angle, pitch angle and yaw angle of the end point r1, p1 and y1. This calculation can be understood as first reconstruction the direction of θ onto the actual plane where the vehicle currently is and then projecting it respectively onto the x-, y- and z-axis, in a similar way that the roll angle, pitch angle and yaw angle are defined. For example, θr may be calculated as the projection of θ onto the x-z plane, θp may be calculated as the projection of θ onto the y-z plane, and θy may be calculated as the projection of θ onto the x-y plane (i.e., the θ'). Then, the calculated projection (θr, θp, θy) tells what the exact heading of the vehicle is in the 3D space;
4. Getting the 6D delta pose of the vehicle (Δx', Δy', Δz, θr, θp, θy). From the above steps, Δx', Δy', θr, θp and θy have already been obtained. Now, Δz may be obtained by simply calculating the difference between z1 and z0. Thus, the final 6D delta pose of the vehicle (Δx', Δy', Δz, θr, θp, θy) is obtained.

Figure 5:
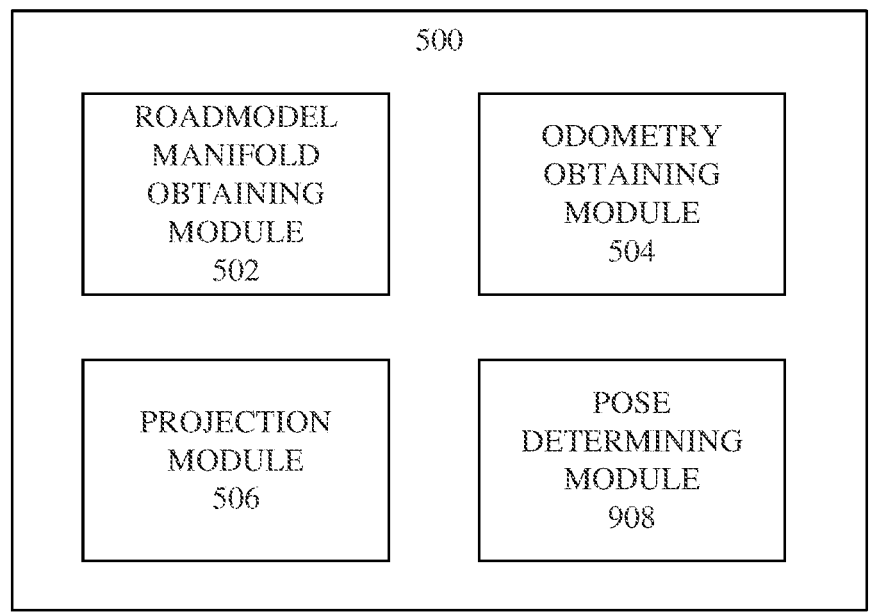
FIG. 5 illustrates an exemplary pose determination apparatus for getting a 6-dimensional (6D) delta pose of a vehicle according to an embodiment of the present invention.

FIG. 5 illustrates an exemplary pose determination apparatus 500 for getting a 6-dimensional (6D) delta pose of a vehicle according to an embodiment of the present invention. The pose determination apparatus 500 may comprise a roadmodel manifold obtaining module 502 for obtaining a pre-defined roadmodel 2-dimensional (2D) manifold in 6D space, wherein the roadmodel 2D manifold in 6D space is pre-defined by transforming objects in a roadmodel from 3D (x, y, z) space into 6D (x, y, z, r, p, y) space, wherein x and y represent positions of objects on a horizontal plane, and z, r, p and y represent the height, roll angle, pitch angle and yaw angle of the objects in real world; an odometry obtaining module 504 for obtaining a delta 3D odometry (Δx, Δy, θ) from an odometer of the vehicle, wherein Δx and Δy represent the movements in the lateral and forward-reverse directions, and θ represents a current heading of the vehicle; a projection module 506 for projecting the obtained delta 3D odometry (Δx, Δy, θ) onto the roadmodel 2D manifold; and a pose determining module 508 for determining the 6D delta pose of the vehicle (Δx', Δy', Δz, θr, θp, θy) corresponding to the delta 3D odometry.

Figure 6:
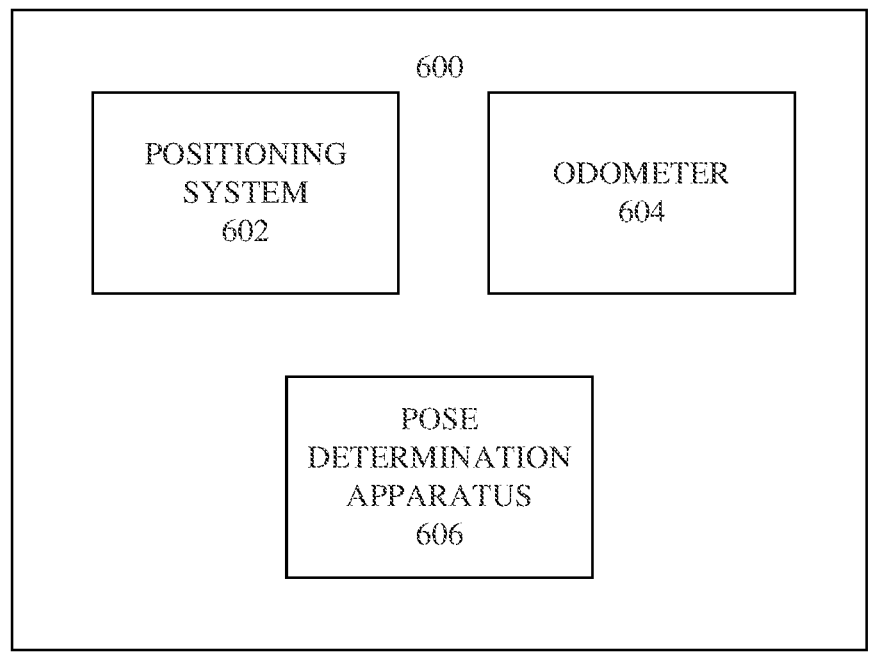
FIG. 6 illustrates an exemplary vehicle according to an embodiment of the present invention.

FIG. 6 illustrates an exemplary vehicle 600 according to an embodiment of the present invention. The vehicle 600 may comprise a positioning system 602 for determining positions of the vehicle; an odometer 604 for providing delta 3D odometries (Δx, Δy, θ) of the vehicle, wherein Δx and Δy represent the movements in the lateral and forward-reverse directions, and θ represents a current heading of the vehicle; and a pose determination apparatus 606 for getting a 6-dimensional (6D) delta pose of a vehicle, such as the pose determination apparatus 500. The positioning system 602 may further comprises a satellite positioning system receiver and at least one of the following sensors; Lidar; radar; and camera. The positioning system 602 may determine positions of the vehicle based on the data provided by the satellite positioning system receiver or the at least one of the sensors.

With knowledge of real-time 6D delta poses of a vehicle, further processing can be performed, especially regarding automated driving. As a further embodiment, the vehicle 600 may further comprise a navigation system, which may be configured to receive a current position of the vehicle (x1, y1, z1, r1, p1, y1) from the pose determination apparatus 602; and to provide navigation based, at least in part, on the current position of the vehicle. In another embodiment, the vehicle 600 may further comprise a driving decision module, which may be configured to receive a current position of the vehicle (x1, y1, z1, r1, p1, y1) from the pose determination apparatus; and to make driving decisions based, at least in part, on the current position of the vehicle.

Figure 7:
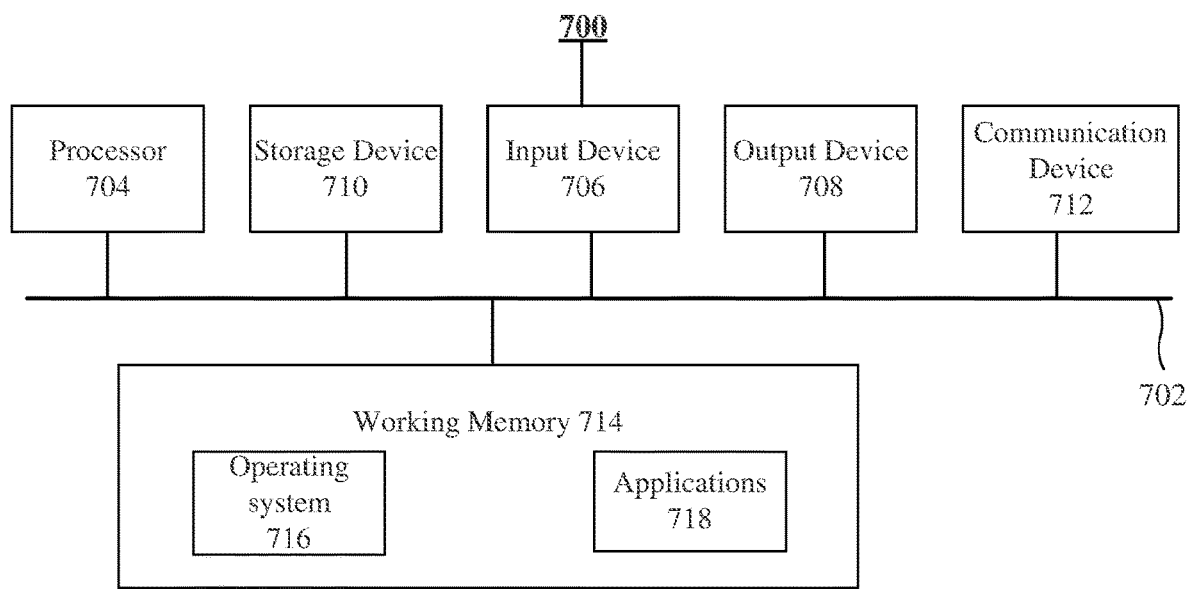
FIG. 7 illustrates a general hardware environment wherein the present disclosure is applicable in accordance with an exemplary embodiment of the present disclosure.

FIG. 7 illustrates a general hardware environment 700 wherein the method and apparatus for getting a 6-dimensional (6D) delta pose of a vehicle may be applicable in accordance with an exemplary embodiment of the present disclosure.

With reference to FIG. 7, a computing device 700, which is an example of the hardware device that may be applied to the aspects of the present disclosure, will now be described. The computing device 700 may be any machine configured to perform processing and/or calculations, and may be but is not limited to a work station, a server, a desktop computer, a laptop computer, a tablet computer, a personal data assistant, a smart phone, an on-vehicle computer or any combination thereof. The aforementioned system may be wholly or at least partially implemented by the computing device 700 or a similar device or system.

The computing device 700 may comprise elements that are connected with or in communication with a bus 702, possibly via one or more interfaces. For example, the computing device 700 may comprise the bus 702, one or more processors 704, one or more input devices 706 and one or more output devices 708. The one or more processors 704 may be any kinds of processors, and may comprise but are not limited to one or more general-purpose processors and/or one or more special-purpose processors (such as special processing chips). The input devices 706 may be any kinds of devices that can input information to the computing device, and may comprise but are not limited to a mouse, a keyboard, a touch screen, a microphone and/or a remote control. The output devices 708 may be any kinds of devices that can present information, and may comprise but are not limited to display, a speaker, a video/audio output terminal, a vibrator and/or a printer. The computing device 700 may also comprise or be connected with non-transitory storage devices 710 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 710 may be detachable from an interface. The non-transitory storage devices 710 may have data/instructions/code for implementing the methods and steps which are described above. The computing device 700 may also comprise a communication device 712. The communication device 712 may be any kinds of device or system that can enable communication with external apparatuses and/or with a network, and may comprise but are not limited to a modem, a network card, an infrared communication device, a wireless communication device and/or a chipset such as a Bluetooth™ device, 802.11 device, WiFi device, WiMax device, cellular communication facilities and/or the like.

When the computing device 700 is used as an on-vehicle device, it may also be connected to external device, for example, a GPS receiver, or sensors for sensing different environmental data such as an acceleration sensor, a wheel speed sensor, a gyroscope and so on. In this way, the computing device 700 may, for example, receive location data and sensor data indicating the travelling situation of the vehicle. When the computing device 700 is used as an on-vehicle device, it may also be connected to other facilities (such as an engine system, a wiper, an anti-lock Braking System or the like) for controlling the traveling and operation of the vehicle.

In addition, the non-transitory storage device 710 may have map information and software elements so that the processor 704 may perform route guidance processing. In addition, the output device 706 may comprise a display for displaying the map, the location mark of the vehicle, and images indicating the travelling situation of the vehicle. The output device 706 may also comprise a speaker or interface with an ear phone for audio guidance.

The bus 702 may include but is not limited to Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 702 may also include a Controller Area Network (CAN) bus or other architectures designed for application on an automobile.

The computing device 700 may also comprise a working memory 714, which may be any kind of working memory that may store instructions and/or data useful for the working of the processor 704, and may comprise but is not limited to a random access memory and/or a read-only memory device.

Software elements may be located in the working memory 714, including but not limited to an operating system 716, one or more application programs 718, drivers and/or other data and codes. Instructions for performing the methods and steps described in the above may be comprised in the one or more application programs 718, and the units of the aforementioned apparatus 800 may be implemented by the processor 704 reading and executing the instructions of the one or more application programs 718. The executable codes or source codes of the instructions of the software elements may be stored in a non-transitory computer-readable storage medium, such as the storage device (s) 710 described above, and may be read into the working memory 714 possibly with compilation and/or installation. The executable codes or source codes of the instructions of the software elements may also be downloaded from a remote location.

Those skilled in the art may clearly know from the above embodiments that the present disclosure may be implemented by software with necessary hardware, or by hardware, firmware and the like. Based on such understanding, the embodiments of the present disclosure may be embodied in part in a software form. The computer software may be stored in a readable storage medium such as a floppy disk, a hard disk, an optical disk or a flash memory of the computer. The computer software comprises a series of instructions to make the computer (e.g., a personal computer, a service station or a network terminal) execute the method or a part thereof according to respective embodiment of the present disclosure.

Reference has been made throughout this specification to "one example" or "an example", meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method for determining a 6-dimensional (6D) delta pose of a vehicle, the method comprising:

obtaining a pre-defined roadmodel 2-dimensional (2D) manifold in 6D space, wherein the roadmodel 2D manifold in 6D space is pre-defined by transforming objects in a roadmodel from 3D (x, y, z) space into 6D (x, y, z, r, p, y) space, wherein x and y respectively represent positions of objects on a horizontal plane, and z, r, p and y respectively represent a height, roll angle, pitch angle and yaw angle of the objects in a real world;

obtaining a delta 3D odometry ($\Delta x$, $\Delta y$, $\theta$) from an odometer of the vehicle, wherein $\Delta x$ and $\Delta y$ respectively represent movements in lateral and forward-reverse directions, and $\theta$ represents a current heading of the vehicle;

projecting the obtained delta 3D odometry ($\Delta x$, $\Delta y$, $\theta$) onto the roadmodel 2D manifold;

determining the 6D delta pose of the vehicle ($\Delta x'$, $\Delta y'$, $\Delta z$, $\theta r$, $\theta p$, $\theta y$) corresponding to the obtained delta 3D odometry ($\Delta x$, $\Delta y$, $\theta$); and using a current position of the vehicle (x1, y1, z1, r1, p1, y1) to provide navigation of the vehicle or to make driving decisions of the vehicle;

wherein projecting the obtained delta 3D odometry ($\Delta x$, $\Delta y$, $\theta$) onto the roadmodel 2D manifold comprises:

obtaining a position of a start point (x0, y0, z0) of the delta 3D odometry ($\Delta x$, $\Delta y$, $\theta$);

determining the start point (x0, y0, z0) in the roadmodel 2D manifold (x0, y0, z0, r0, p0, y0); and calculating projections ($\Delta x'$, $\Delta y'$ and $\theta'$) of the delta 3D odometry ($\Delta x$, $\Delta y$, $\theta$) on the horizontal plane based on r0, p0 and y0; and wherein determining the 6D delta pose of the vehicle ($\Delta x'$, $\Delta y'$, $\Delta z$, r, p, y) corresponding to the delta 3D odometry ($\Delta x$, $\Delta y$, $\theta$) comprises:

determining a projection of the end point (x1, y1) of the delta 3D odometry ($\Delta x$, $\Delta y$, $\theta$) on the horizontal plane based on the position of the start point and the calculated projections ($\Delta x'$, $\Delta y'$) of the delta 3D odometry ($\Delta x$, $\Delta y$, $\theta$);

determining a position of the end point in the 6D space (x1, y1, z1, r1, p1, y1), wherein the current position of the vehicle (x1, y1, z1, r1, p1, y1) is the position of the end point in the 6D space (x1, y1, z1, r1, p1, y1);

calculating a projection ($\theta r$, $\theta p$, $\theta y$) of a heading $\theta$ of the delta 3D odometry in the 6D space based on the roll angle, the pitch angle and the yaw angle of the end point r1, p1 and y1; and obtaining the 6D delta pose of the vehicle (Δx', Δy', Δz, θr, θp, θy), wherein Δz is a difference between z1 and z0.

2. The method according to claim 1, wherein the position of the start point (x0, y0, z0) of the delta 3D odometry (Δx, Δy, θ) is obtained from a positioning system of the vehicle.

3. The method according to claim 1, wherein the position of the start point (x0, y0, z0) of the delta 3D odometry (Δx, Δy, θ) is derived as a position of an end point of a previous delta 3D odometry (Δx, Δy, θ).

4. A pose determination apparatus for determining a 6-dimensional (6D) delta pose of a vehicle, the pose determination apparatus comprising:

a roadmodel manifold obtaining module for obtaining a pre-defined roadmodel 2-dimensional (2D) manifold in 6D space, wherein the roadmodel 2D manifold in 6D space is pre-defined by transforming objects in a roadmodel from 3D (x, y, z) space into 6D (x, y, z, r, p, y) space, wherein x and y respectively represent positions of objects on a horizontal plane, and z, r, p and y respectively represent a height, roll angle, pitch angle and yaw angle of the objects in a real world;

an odometry obtaining module for obtaining a delta 3D odometry (Δx, Δy, θ) from an odometer of the vehicle, wherein Δx and Δy respectively represent movements in lateral and forward-reverse directions, and θ represents a current heading of the vehicle;

a projection module for projecting the obtained delta 3D odometry (Δx, Δy, θ) onto the roadmodel 2D manifold; and a pose determining module for determining the 6D delta pose of the vehicle (Δx', Δy', Δz, θr, θp, θy) corresponding to the obtained delta 3D odometry (Δx, Δy, θ) and for providing a current position of the vehicle (x1, y1, z1, r1, p1, y1) to a navigation system or to a driving decision module, wherein the navigation system is configured to use the current position of the vehicle (x1, y1, z1, r1, p1, y1) to provide navigation of the vehicle, and wherein the driving decision module is configured to use the current position of the vehicle (x1, y1, z1, r1, p1, y1) to make driving decisions of the vehicle;

wherein projecting the obtained delta 3D odometry (Δx, Δy, θ) onto the roadmodel 2D manifold comprises:
obtaining a position of a start point (x0, y0, z0) of the delta 3D odometry (Δx, Δy, θ);
determining the start point (x0, y0, z0) in the roadmodel 2D manifold (x0, y0, z0, r0, p0, y0); and
calculating projections (Δx', Δy' and θ') of the delta 3D odometry (Δx, Δy, θ) on the horizontal plane based on r0, p0 and y0; and wherein determining the 6D delta pose of the vehicle (Δx', Δy', Δz, r, p, y) corresponding to the delta 3D odometry (Δx, Δy, θ) comprises:
determining a projection of the end point (x1, y1) of the delta 3D odometry (Δx, Δy, θ) on the horizontal plane based on the position of the start point and the calculated projections (Δx', Δy') of the delta 3D odometry (Δx, Δy, θ);

determining a position of the end point in the 6D space (x1, y1, z1, r1, p1, y1), wherein the current position of the vehicle (x1, y1, z1, r1, p1, y1) is the position of the end point in the 6D space (x1, y1, z1, r1, p1, y1);

calculating a projection (θr, θp, θy) of a heading θ of the delta 3D odometry in the 6D space based on the roll angle, the pitch angle and the yaw angle of the end point r1, p1 and y1; and obtaining the 6D delta pose of the vehicle (Δx', Δy', Δz, θr, θp, θy), wherein Δz is a difference between z1 and z0.

5. The pose determination apparatus according to claim 4, wherein the position of the start point (x0, y0, z0) of the delta 3D odometry (Δx, Δy, θ) is obtained from a positioning system of the vehicle.

6. The pose determination apparatus according to claim 4, wherein the position of the start point (x0, y0, z0) of the delta 3D odometry (Δx, Δy, θ) is derived as a position of an end point of a previous delta 3D odometry.

7. A vehicle comprising:
a positioning system for determining positions of the vehicle;
an odometer for providing the delta 3D odometries (Δx, Δy, θ) of the vehicle; and
the pose determination apparatus for determining the 6-dimensional (6D) delta pose of the vehicle according to claim 4.

8. The vehicle according to claim 7, wherein the positioning system comprises a satellite positioning system receiver and at least one of the following sensors:
Lidar;
radar; or
a camera.

9. The vehicle according to claim 8, wherein the positioning system determines positions of the vehicle based on data provided by the satellite positioning system receiver or the at least one of the sensors.

10. The vehicle according to claim 7, further comprising:
the navigation system, wherein the navigation system is configured to:
receive the current position of the vehicle (x1, y1, z1, r1, p1, y1) from the pose determination apparatus; and
provide navigation based, at least in part, on the current position of the vehicle (x1, y1, z1, r1, p1, y1).

11. The vehicle according to claim 7, further comprising:
the driving decision module, wherein the driving decision module is configured to:
receive the current position of the vehicle (x1, y1, z1, r1, p1, y1) from the pose determination apparatus; and
make driving decisions based, at least in part, on the current position of the vehicle (x1, y1, z1, r1, p1, y1).

* * * * *